United States Patent [19]

Dünwald et al.

[11] Patent Number: 5,061,515

[45] Date of Patent: Oct. 29, 1991

[54] LACQUER BINDERS, A PROCESS FOR COATING HEAT RESISTANT SUBSTRATES AND THE COATED SUBSTRATES

[75] Inventors: Willi Dünwald; Hans Schlegel, both of Leverkusen, Fed. Rep. of Germany

[73] Assignee: Bayer Aktiengesellschaft, Leverkusen, Fed. Rep. of Germany

[21] Appl. No.: 504,830

[22] Filed: Apr. 5, 1990

Related U.S. Application Data

[62] Division of Ser. No. 196,178, May 19, 1988, abandoned.

[30] Foreign Application Priority Data

May 30, 1987 [DE] Fed. Rep. of Germany ....... 3718238

[51] Int. Cl.$^5$ .............................................. C23C 26/00
[52] U.S. Cl. ..................................... 427/120; 525/61; 524/557
[58] Field of Search .......................... 427/120; 525/61; 524/557

[56] References Cited

U.S. PATENT DOCUMENTS

| | | | |
|---|---|---|---|
| 2,307,588 | 1/1943 | Jackson et al. ...................... | 174/125 |
| 3,068,189 | 12/1962 | Lavin et al. ........................ | 260/45.1 |
| 3,069,379 | 12/1962 | Lavin et al. ........................ | 260/43 |
| 4,248,978 | 2/1981 | de Cleus ............................... | 525/124 |
| 4,366,288 | 12/1982 | Resz et al. ........................... | 525/61 |

*Primary Examiner*—Shrive Beck
*Assistant Examiner*—V. Duong Dang
*Attorney, Agent, or Firm*—Joseph C. Gil; Thomas W. Roy

[57] ABSTRACT

The present invention is directed to lacquer binders containing polyvinyl acetal which are suitable for the formation of films and coatings and contain mixtures of
a) polyvinyl acetals and
b) organic compounds containing (i) carbodiimide and/or uretone imine groups and (ii) blocked isocyanate groups, the mixtures containing from 1 to 300 parts by weight of component b) per 100 parts by weight of component a).

The invention is also directed to a process for the formation of coatings on heat resistant substrates by coating these substrates with a coating composition containing binder, inert solvent and optionally the conventional auxiliary agents and additives used in lacquer technology, followed by curing of the coating at temperatures above about 80° C., characterized in that the coating compositions used contain binders of the type mentioned above. Finally, the present invention is directed to these coated heat resistant substrates.

4 Claims, No Drawings

LACQUER BINDERS, A PROCESS FOR COATING HEAT RESISTANT SUBSTRATES AND THE COATED SUBSTRATES

This application is a division of application Ser. No. 07/196,178 filed May 19, 1988.

BACKGROUND OF THE INVENTION

1. Field of the Invention

The present invention is directed to new lacquer binders containing polyvinyl acetals and specific polyisocyanates with blocked isocyanate groups, a process for the formation of coatings on heat resistant substrates using coating compositions containing these binders, and the coated heat resistant substrates.

2. Description of the Prior Art

Stoving lacquers based on polyvinyl acetals, in particular for the insulation of electric conductors, have been known for a long time. U.S. Pat. No. 2,307,588, for example, describes lacquers based on polyvinyl acetals containing phenol resins as additives. In DE-AS 1,179,320, it is recommended to incorporate blocked polyisocyanates in such coating compounds for the purpose of improving the solvent resistance and long term heat resistance of the lacquers. According to DE-AS 1,153,127, a further improvement in such coating compounds consists of the additional use of melamine resins. This four fold combination of polyvinyl acetal (polyvinyl formal), blocked polyisocyanate, phenol resin and melamine resin, known as "Hermetic Formulation," has proven to be particularly useful in the manufacture of insulating wires for enclosed assemblies of refrigerating machines.

The last mentioned binder combination has proven its suitability for wire coating over several decades in use. It has now surprisingly been found, however, that the advantageous properties of these systems may be even further improved to a remarkable extent by using binders of the type according to the invention described below, which are primarily based on a polyvinyl acetal component and a specific polyisocyanate component.

By using the binders according to the invention described below, it is possible in particular to increase the abrasion resistance, the softening temperature and the increase in dielectric loss factor tan $\delta$ according to DIN 53 483. Conversely, the already advantageous properties of the systems known in the art may be obtained even when the lacquering speed is increased.

Another advantage of the binders according to this invention is that excellent lacquer properties are obtained even when polyvinyl acetals having a comparatively low molecular weight are used, i.e. polyvinyl acetals which in the form of a 10% by weight solution in furfural have a comparatively low viscosity. It was previously considered a fact of experience that satisfactory properties could only be obtained from starting materials having a sufficiently high molecular weight because the time available during the stoving process is not sufficient for forming a very large number of cross-linking points or cross-linking proceeds too spontaneously so that the solvents cannot evaporate without disturbing the film which is in the process of formation, with the result that a poor quality surface is obtained.

It has now been discovered that products with a lower molecular weight may be used enables lacquers with a higher solids content to be used, which is an advantage both economically and environmentally.

SUMMARY OF THE INVENTION

The present invention is directed to lacquer binders containing polyvinyl acetal which are suitable for the formation of films and coatings and contain mixtures of
a) polyvinyl acetals and
b) organic compounds containing (i) carbodiimide and/or uretone imine groups and (ii) blocked isocyanate groups, the mixtures containing from 1 to 300 parts by weight of component b) per 100 parts by weight of component a).

The invention is also directed to a process for the formation of coatings on heat resistant substrates by coating these substrates with a coating composition containing binder, inert solvent and optionally the conventional auxiliary agents and additives used in lacquer technology, followed by curing of the coating at temperatures above about 80° C., characterized in that the coating compositions used contain binders of the type mentioned above. Finally, the present invention is directed to these coated heat resistant substrates.

DETAILED DESCRIPTION OF THE INVENTION

Component a) is based on polyvinyl acetals obtained in a known manner by the reaction of partially or completely hydrolyzed polyvinyl carboxylates, in particular polyvinyl acetate, with an aldehyde. The polyvinyl acetals suitable as component a) according to the invention have a viscosity of about 20 to 1500 mPa.s, preferably about 90 to 150 mPa.s at 23° C. when made up into a 10% by weight solution in furfural. The polyvinyl acetals are preferably partially or completely saponified polyvinyl acetates in which the hydroxyl groups in the side chains have been partly or completely converted into formal groups by reaction with formaldehyde. Polyvinyl acetals, i.e. polyvinyl formals, which are particularly preferred as component a) are those in which the acetate, hydroxyl and formal group content corresponds to that of a mixture of at least about 80% by weight of pure polyvinyl formal, about 9 to 13% by weight of pure polyvinyl acetate and about 5 to 6.5% by weight of pure polyvinyl alcohol.

It is possible in principle to use, as component a), polyvinyl acetals which have been prepared by the modification of an at least partially saponified polyvinyl carboxylate, in particular a polyvinyl acetate, with aldehydes other than formaldehyde, for example with acetaldehyde, propionaldehyde, butyraldehyde or benzaldehyde. Mixtures of different aldehydes may also be used for modifying the at least partially saponified polyvinyl carboxylates.

Component b) according to the invention consists of compounds containing (i) carbodiimide and/or uretone imine groups and (ii) blocked isocyanate groups. The proportion of carbodiimide groups (calculated as —N=C=N—) is generally 0 to about 25% by weight, preferably about 1 to 20% by weight, and the proportion of uretone imine groups (calculated as structural units of the overall formula $C_2N_3O$) is generally 0 to about 30% by weight, preferably 0 to about 25% by weight. The sum of carbodiimide groups and uretone imine groups (formally calculated as —N=C=N—) is generally about 0.5 to 25% by weight, preferably about 1 to 20% by weight, and the proportion of blocked isocyanate groups (calculated as NCO) is generally about 1 to 25% by weight, preferably about 5 to 22% by weight.

These compounds may be prepared by blocking about 10 to 90%, preferably about 20 to 80% and most preferably about 30 to 70% of the isocyanate groups of an organic polyisocyanate by a reaction with a monofunctional blocking agent for isocyanate groups, and then converting about 65 to 100% of the remaining, free isocyanate groups into carbodiimide groups with liberation of carbon dioxide.

The uretone imine groups which may be present in the compounds are formed by addition of free isocyanate groups which may still be present to the carbodiimide groups formed in the reaction. The preparation of these compounds is described in detail in DE-OS 3,600,766 (U.S. Ser. No. 001,119, filed Jan. 7, 1987, herein incorporated by reference in its entirety) and the embodiments and starting materials mentioned as preferred in that reference are also preferred for the present invention.

The binders according to the invention contain about 1 to 300 parts by weight, preferably about 20 to 220 parts by weight of component b) per 100 parts by weight of component a). If the quantities of component b) are relatively small, the surface structures obtained, i.e. in particular lacquer coats, are flexible whereas both the hardness and the chemical resistance of the coatings increase with increasing proportions of component b).

The binders according to the invention may also contain auxiliary agents and additives as additional component c). These additional components include solvents such as phenol, cresols, xylenols, benzyl alcohol or mixtures of these solvents with each other or with blending agents such as alkyl benzenes, glycol ethers or glycol ether acetates of known type.

Other auxiliary agents optionally used include catalysts, for example of the type described in DE-AS 2,626,175, column 7, line 85 to column 8, line 87 or in U.S. Pat. No. 4,100,144, herein incorporated by reference in its entirety. Reaction products of amines with carbonyl compounds are also suitable, e.g. the addition product of aniline to butyraldehyde, as are organic metal catalysts such as zinc stearate, tin(II)-octoate, dibutyl tin dilaurate, titanium tetrabutylate and triethanolamine titanate. The catalysts, if used at all, are added in a quantity of about 0.01 to 5.0% by weight, preferably about 0.1 to 3.0% by weight, based on the quantity of components a) and b).

Further examples of auxiliary agents and additives optionally used include polyisocyanates which have blocked isocyanate groups but do not conform to the definition of component b), e.g. the phenol-blocked trimer of 2,4-diisocyantotoluene containing isocyanurate groups; isocyanate reactive compounds of the type hitherto used for wire coatings and described, for example, in DE-OS 3,600,766; phenol resins, melamine resins, amido-imides, polyepoxides, imido esters, imido ester imides and/or hydantoins. These components optionally used as auxiliary agents and additives may serve to vary the properties of the binders according to this invention or of the lacquer coats obtained according to the invention. Thus, for example, the softening temperature of the lacquer films finally obtained may be raised to above about 400° C. by the addition of melamine resins and/or phenol resins of the type described in the above-mentioned literature references.

The mixtures obtained by mixing the above mentioned essential individual components of the present invention and optionally auxiliary agent and additives at room temperature as well as the coating compounds ready for use which have been obtained from the binders according to the invention are stable in storage at room temperature or moderately elevated temperature (up to about 50° C.). Surface structures prepared from the ready for use coating compounds are converted into cross-linked plastics by heating to temperatures above about 80° C., preferably about 40° to 700° C. and most preferably about 200° to 500° C., while evaporating off any volatile components present (e.g. solvents).

This cross-linking reaction affects cross-linking of the substantially linear polyvinyl acetals with the polyisocyanate component b) but the exact mechanisms of this cross-linking reaction is not known. The advantages obtained according to the invention are obviously due to the presence of the carbodiimide groups and/or uretone imine groups in component b).

When the coating compounds are used according to this invention for the formation of lacquer coats on heat resistant substrates, in particular when they are used in the process according to the invention for the formation of lacquer coats on wires, they may be applied to suitable substrates by any known methods employed in coating technology, and after their application the coating is cured within the above mentioned temperature ranges. Suitable substrates include metals, ceramics and glass fibers and fabrics. Metal wires are particularly preferred substrates.

For the preferred use of lacquer coating of wire, the wires are coated by the known processes of immersion, roller application or nozzle stripping, and the lacquer coats are then dried, i.e. cured, in conventional drying ovens within the given temperature ranges.

By virtue of the given electrical and mechanical properties of the cured sheet structures, the binders according to the invention are also suitable for the manufacture of insulating fabrics or for the impregnation of electric motors.

The invention is further illustrated but is not intended to be limited by the following examples in which all parts and percentages are by weight unless otherwise specified.

EXAMPLES

EXAMPLE 1 (Comparison Example Using a Commercial Polyvinyl Formal Lacquer)

100 parts by weight of a commercial polyvinyl formal resin (Vinylec F/L of Chisso Corporation/Japan) which, in the form of a 10% solution in furfural, had a viscosity of about 120 mPa.s and in which the acetate, hydroxyl and formal group content corresponds to a mixture of about 11% polyvinyl acetate, about 6% polyvinyl alcohol and about 83% of pure polyvinyl formal were dissolved together with 60 parts by weight of an adduct (prepared from 1 mol of trimethylol propane, 3 mol of 2,4-diisocyantotoluene and 3 mol of phenol), 16.7 parts by weight of a commercial solution of a phenol-formaldehyde resin having a solids content of 60% (Phenodur PR of Hoechst AG) and 13.6 parts by weight of a commercial solution of a melamine formaldehyde resin having a solids content of 55% (Maprenal MF 800 of Hoechst AG) in a solvent mixture of equal parts by weight of cresol and xylene so that the solids content obtained was 20%. The time of flow through a DIN cup 4 mm at 23° C. was 150 seconds. 1.8 parts by weight of a commercial butyraldehyde-aniline condensate (Vulkacit 576 of Rheinchemie, Mannheim) were added to the lacquer as catalyst.

The comparison lacquer prepared as described above worked up as described below.

EXAMPLE 2 (Lacquer According to the Invention)

Preparation of component b) according to the invention:

2160 g of cresol were added at 80° C. in the course of 1 hour to a mixture of 2500 g of 4,4'-diisocyanatodiphenylmethane and 1740 g of 2,4-diisocyanatotoluene and 2,6-diisocyanatotoluene (ratio by weight=8.2) and the components were reacted together at 100 to 120° C. for about 4 hours. When an isocyanate content of 13.2% was reached (NCO theor.=13.1%), the reaction mixture was diluted with 2740 g of glycol monomethylether acetate.

Carbodiimide formation was catalyzed by the addition of 20 g of methyl phospholine oxide (a commercial mixture of 1-methyl-1-phospha-2-cyclopentene-1-oxide and 1-methyl-1-phospha-3-cyclopentene-1-oxide) at 60° C. The evolution of $CO_2$ reached a final value of 201 liters (about 90% of the theoretical maximum quantity) after about 15 hours.

A solution of a blocked polyisocyanate having the following characteristics was obtained:

| | |
|---|---|
| Concentration | about 70% |
| Viscosity (23° C.) | 4600 mPa · s |
| Free isocyanate content | <0.1% |
| Blocked isocyanate content (calculated as NCO) | 9.6% |
| IR | 2140 cm$^{-1}$ |
| Carbodiimide content (calculated as —N=C=N— from the quantity of $CO_2$) | 2.9% |
| Uretone imine content (calculated as $C_2N_3O$ from the quantity of $CO_2$) | 2.2% |

100 parts by weight of the polyvinyl formal resin described in Example 1 were dissolved in 614 parts by weight of a solvent mixture of equal parts of cresol and xylene. When the solution was cold, 86 parts by weight of the 70% solution of the blocked polyisocyanate containing carbodiimide and uretone imine groups were added thereto and 1.6 parts by weight of the butyraldehyde-aniline condensate of Example 1 were added to the solution. The resulting lacquer had a solids content of 20%.

The lacquer solutions prepared according to Examples 1 and 2 were applied to an enamelled copper wire at an oven temperature of 500° C., using a vertical wire lacquering installation MAG VE 5, 5 meters in length. The increase in diameter due to the lacquer coat was about 55 μm and was obtained by 10 individual applications. Stripper nozzles graded as follows were used: 0.76, 0.77, 0.78, 0.79, 0.80, 0.81, 0.82, 0.83, 0.84, 0.85 mm.

The comparison given in Table 1 between the state of the art lacquer wire and the lacquer wire according to this invention clearly shows the great improvements obtained. The chosen wire lacquering speed was 70 meters per minute.

TABLE 1

| | Example 1 according to the state of art | Example 2 according to the invention |
|---|---|---|
| tan δ intersection point | 100° C. | 150° C. |
| abrasion resistance | 20 | 80 |

TABLE 1-continued

| | Example 1 according to the state of art | Example 2 according to the invention |
|---|---|---|
| (double strokes/loading weight: 390 g) | | |
| Softening temperature of lacquer coat (DIN 46 453.2) | 290° C. | 350° C. |

The "tan δ intersection point" is the temperature at which an increase in the dielectric loss factor according to DIN 53 483 takes place. The dielectric loss factor tan δ is a measure of the energy losses due to part of the energy of the electric field being consumed for heating.

An aqueous graphite dispersion was brushed over the wire sample before the test and dried at about 90° C. for 2 hours.

The dielectric loss factor was measured between the copper conductor and the graphite coating.

When this value was measured in dependence upon the temperature, an increase in the measured value (="tan δ intersection point") took place at a certain temperature. This temperature is a measure of the heat resistance of the lacquer coat.

The abrasion resistance was determined by the following method:

The copper wire to be tested was loaded at right angles with a steel pin which was acted upon by a weight which had been standardized according to the diameter of the wire and the thickness of the layer of lacquer. An electric voltage was applied between the steel pin and the copper. The steel pin was passed backwards and forwards over the test wire until it had scraped through the layer of lacquer so that electric contact was established between the steel pin and the copper wire. The number of double strokes required for establishing this electric contact was recorded. To compensate for any eccentricities, the wire was turned twice through 120° and tested each time after it had been turned.

The values given for comparison Example 1 were also obtained as a first approximation when the coating compound according to Example 2 was applied at about 1.5 times the lacquering speed.

EXAMPLE 3

100 parts by weight of the polyvinyl formal resin described in Example 1, 86 parts by weight of the polyisocyanate prepared according to Example 2, 10 parts by weight of the phenol resin according to Example 1, 7.6 parts by weight of the melamine formaldehyde resin according to Example 1 and 1.6 parts by weight of zinc octoate (8% Zn in a solvent mixture of m-, p- cresol and xylene (1:1 parts by weight)) were dissolved together to form a solution having a solids content of 20%. The flow time through DIN cup 4 mm at 23° C. was 215 seconds.

The lacquer solution was applied to a wire 0.7 mm in diameter in 6 passages on a 4 meter radiant oven to produce an increase in diameter of 50 μm. The nozzle diameter was graded 0.76, 0.78, 0.80, 0.82, 0.84, 0.86.

The lacquer of Example 1 was subjected to the same process. The rate at which it was pulled through was varied from 10 m/min to 24 m/min. The results obtained from determinations of the softening temperature (DIN 46 453.2) are shown in Table 2.

TABLE 2

| Lacquering Speed (m/min) | Softening Temperature (°C.) Example 1 | Softening Temperature (°C.) Example 3 |
| --- | --- | --- |
| 10 | 375 | 420 |
| 12 | 285 | 420 |
| 14 | 280 | — |
| 16 |  | 330 |
| 18 |  |  |
| 20 | 275 |  |
| 22 |  | 300 |
| 24 | 265 | 295 |

EXAMPLE 4

4a) A 4-component lacquer was prepared as in Example 1 with the exception that the polyvinyl formal resin which had a viscosity of about 65 mPa.s as a 10% by weight solution in furfural at 23° C. and otherwise had the same constituents as the polyvinyl formal resin used in Example 1 ( ®Vinylec K of Chisso Corporation/Japan). 1,9 parts by weight zinc octoate was used as catalyst. Because of the lower viscosity of the polyvinyl formal resin, however, this 4-component lacquer was adjusted to a solids content of 25% with the solvent used in Example 1.

4b) Preparation of a polyisocyanate component. 2160 g of cresol were added dropwise to 5000 g of 4,4'-diisocyanatodiphenyl methane at 80° C. within 2 hours and the components were reacted at 120° C. An isocyanate content of 11.8% (NCO theor.=11.7%) was reached after about 4 hours, and the reaction product was diluted by the addition of 3070 g of methoxypropyl acetate to a 70% solution having an isocyanate content of 8.3% (NCO theor.=8.2%). Carbodiimide formation was catalyzed at 60° C. by the addition of 20 g (0.2%) of methyl phospholine oxide (a commercial mixture of 1-methyl-1-phospha-2-cyclopentene-1-oxide and 1-methyl-1-phospha-3-cyclopentene-1-oxide) and the progress of the reaction was followed by measurement of the evolution of $CO_2$.

After about 12 hours, the evolution of gas came to a standstill at 220 liters of $CO_2$ (<90% of the theoretical maximum quantity). The calculated conversion rates based on the evolution of $CO_2$ and the reduction in NCO content were consistent. The solution of a blocked isocyanate having the following characteristics was obtained:

| concentration | about 70% |
| --- | --- |
| viscosity (23° C.) | <0.1% |
| blocked NCO content | 8.5% |

4c) Preparation of a lacquer according to the invention 100 parts by weight of the polyvinyl formal resin described in Example 4a) were dissolved in 394 parts by weight of a solvent mixture of equal parts cresol and xylene. When the solution was cold, 86 parts by weight of the 70% polyisocyanate solution described in Example 4b) was added thereto, and 1.6 parts by weight of zinc octoate was added to the solution.

4d) Use

The lacquers mentioned in Examples 4a) and 4c) were applied to a copper wire 0.7 mm in diameter by means of a laboratory wire lacquering installation. The oven temperature was 500° C.

It was found that at only 90 m/min., the use of lacquer 4a) no longer resulted in any acceptable properties for the lacquered wire, while lacquer 4c) produced a lacquer wire with properties clearly superior to that of the known art lacquer wire even when lacquering was carried out at speeds of up to 120 m/min.

EXAMPLE 5

100 parts by weight of the low viscosity polyvinyl formal according to Example 4a) were dissolved in a solvent mixture of benzyl alcohol and xylene in a ratio by weight of 2:3 to form a 20% solution.

When the solution was cold, it was combined with 214 parts by weight of the solution of blocked isocyanate prepared according to Example 2. 2.5 parts by weight zinc octoate (containing 8% Zn) were then added to this solution. A lacquer having a solids content of 35% was obtained.

This lacquer, which had been prepared with about 20% less solvent, was applied to a copper wire 0.7 mm in diameter by the lacquer application process described in Examples 1 and 2 to increase the diameter to 0.755 mm.

| Lacquering conditions: | vertical oven |
| --- | --- |
|  | oven length: 6 m |
|  | oven temperature: 500° C. |
|  | number of passages: 8 |
|  | grading of stripper nozzles: 0.76 g, 0.77, 0.78, 0.79, 0.80, 0.81, 0.82, 0.83. |

The lacquer wire coated at a speed of 70 m/min. had excellent properties which were comparable to those obtained with the lacquer described in Example 2.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the formation of a coating on a heat resistant wire substrate which comprises coating said substrate with a solvent-containing coating composition containing a binder comprising
   a) a polyvinyl acetal and
   b) about 1 to 300 parts by weight, based on 100 parts of component (a), of an organic compound containing (i) carbodiimide and/or uretone imine groups and (ii) blocked isocyanate groups,
and curing the coating at a temperature above about 80° C.

2. The process of claim 1 wherein component (b) contains 0 to about 25% by weight of carbodiimide groups (calculated as —N=C=N—) and 0 to about 30% by weight of uretone imine groups (calculated as $C_2N_3O$), the sum of carbodiimide groups and uretone imine groups (calculated as —N=C=N—) being about 0.5 to 25% by weight, and about 1 to 25% by weight of blocked isocyanate groups (calculated as NCO).

3. The process of claim 1 wherein component (a) comprises a polyvinyl formal.

4. The process of claim 2 wherein component (a) comprises a polyvinyl formal.

* * * * *